United States Patent [19]
Kapus et al.

[11] Patent Number: 5,351,665
[45] Date of Patent: Oct. 4, 1994

[54] INTERNAL COMBUSTION ENGINE

[75] Inventors: Paul Kapus; Franz Chmela, both of Graz, Austria

[73] Assignee: AVL Gesellschaft fur Verbrennungskraftmaschinen und Mestechnik M.B.H. Prof. Dr. Dr.H.C.Hans List, Graz, Austria

[21] Appl. No.: 60,083

[22] Filed: May 11, 1993

[30] Foreign Application Priority Data

Nov. 26, 1992 [EP]  European Pat. Off. ........ 92120153.9

[51] Int. Cl.$^5$ ............................................. F02F 3/26
[52] U.S. Cl. .................................. 123/276; 123/260; 123/261; 123/256
[58] Field of Search ............... 123/276, 260, 261, 256, 123/285, 299, 279, 281, 282

[56] References Cited

U.S. PATENT DOCUMENTS

| | | | |
|---|---|---|---|
| 4,368,702 | 1/1983 | Finsterwalder et al. | 123/261 |
| 4,635,597 | 1/1987 | Ohashi et al. | 123/276 |
| 4,676,208 | 6/1987 | Moser et al. | 123/276 |
| 4,712,525 | 12/1987 | Ishida | 123/276 |
| 4,784,097 | 11/1988 | Ishida | 123/260 |
| 4,852,525 | 8/1989 | Ishida | 123/256 |
| 5,000,144 | 3/1991 | Schweinzer et al. | 123/276 |
| 5,103,776 | 4/1992 | Sato | 123/261 |
| 5,109,816 | 5/1992 | Sasaki | 123/276 |
| 5,158,055 | 10/1992 | Oh et al. | 123/276 |
| 5,215,053 | 6/1993 | Ito | 123/276 |

Primary Examiner—Raymond A. Nelli
Attorney, Agent, or Firm—Watson, Cole, Grindle & Watson

[57] ABSTRACT

A combustion chamber located in the piston of an internal combustion engine is divided by restrictions into two or more partial chambers. The ratio between the minimum distance in the restricted area and the maximum distance in concave areas of the wall of the combustion chamber, as measured from the axis of the combustion chamber, is greater than or equal to 0.2. To improve the turbulence in the combustion chamber the proposal is put forward that the ratio between the minimum distance in the restricted area and the radius of the piston be smaller than or equal to 0.5, the wall of the combustion chamber being convex in the restricted area, and that the ratio between the maximum distance and piston radius be greater than or equal to 0.7.

8 Claims, 3 Drawing Sheets

INTERNAL COMBUSTION ENGINE

BACKGROUND OF THE INVENTION

The invention relates to an internal combustion engine with at least one reciprocating piston in which a combustion chamber is located which is divided into two or more partial chambers by restrictions extending to the bottom of the combustion chamber, the said partial chambers being shaped asymmetrically as seen from above and being arranged rotation-symmetrically to an axis passing through the center of the combustion chamber and being parallel to the longitudinal axis of the piston, with a minimum distance in the restricted area of the wall of the combustion chamber and a maximum distance in concave-shaped areas of the wall of the combustion chamber, as measured in a cutting plane directly below the piston head, departing from the axis of the combustion chamber, the ratio between minimum distance and maximum distance being greater or equal 0.2.

In extremely lean operation of gas engines emissions of nitrogen oxides may be kept as low as in stoichiometric operation with a three-way catalytic converter, while the internal efficiency is higher and the thermal loads of the components are lower.

Lean mixtures burn at a lower rate, however, which is a disadvantage from the point of view of thermodynamics and leads to fluctuations in the combustion pressure between cycles. An efficient means of increasing the combustion rate is an increase in the turbulent portion of the flow inside the cylinder.

DESCRIPTION OF THE PRIOR ART

In Paper 43, "Development of a medium duty, turbocharged, lean burn natural gas engine", pp 303–315, presented at the NGV meeting in Göteborg, Sweden, Sep. 21-25, 1992, the so-called Nebula chamber is discussed, for instance, i.e., a combustion chamber of an internal combustion engine as described above, which was developed by Ricardo and is known to generate high charge turbulences at the moment of ignition and during combustion. The turbulences in the Nebula chamber are produced by two flows in the combustion chamber which are directed towards the ignition center in the same sense of rotation. Up to an air ratio of lambda=1.6 satisfactory lean operation is possible. If the mixture is still leaner the combustion rate is too low to ensure combustion of the mixture. With the main flows prevailing in the Nebula chamber, which are directed towards the center of the combustion chamber, the turbulence cannot be improved much further, however.

In diesel engines with direct injection the portion of turbulent flow has proved to have a major influence on smoke emission. So far attempts of reducing smoke emission have mainly consisted of checking smoke formation during the first phase of combustion by optimizing the torque level and by injection in a rotationally symmetric combustion chamber.

Another major factor for obtaining low smoke emissions is the oxidation of the soot particles in the further course of the expansion stroke. To obtain satisfactory after-oxidation of the soot particles a high turbulence of the charge is of advantage.

Also in direct injection engines for spark-ignited fuels exhaust emission is improved by a high turbulence of the charge in the cylinder.

SUMMARY OF THE INVENTION

It is an object of this invention to increase the turbulence level of the flow inside the cylinder over that of the Nebula combustion chamber.

In the invention this is achieved by providing that the ratio between the minimum distance in the restricted area and the radius of the piston be smaller or equal 0.5, the wall of the combustion chamber having a convex shape in the restricted area, and further that the ratio between the maximum distance and the piston radius be greater or equal 0.7.

Due to this special shaping of the combustion chamber in the piston head the turbulence-creating flow movements of the Nebula combustion chamber are augmented by further movements of the charge which are essentially directed against one another and have the character of a compression swirl, and which further increase the level of turbulence. In this manner the flow rate near the center of the combustion chamber is kept so low as not to interfere with the initial flame formation by extinguishing the ignition spark of the spark plug located in this area, or by extinguishing the flame front. On the other hand flame propagation is significantly accelerated by the increased flow directed towards the cylinder wall during the downward movement of the piston. In direct injection diesel engines the high level of turbulence results in a particularly efficient after-oxidation of the soot particles, which considerably reduces smoke emission. In direct injection engines for spark-ignited fuels the high turbulence in the cylinder chamber will accelerate evaporation of the fuel film deposited at the wall of the combustion chamber, in addition to the positive effect on the combustion process of the mixture in gas engines. To further increase the compression swirl, and thus the overall turbulence, it is provided in a further development of the invention that the wall of the combustion chamber be inclined, at least in the restricted area, such that the compression area is enlarged.

It is provided in a variant of the invention that the bottom of the combustion chamber be given a convex shape, the ratio between minimum depth at the center of the combustion chamber and maximum depth being at least 0.3. In this way the cylinder charge which would normally be located in this place is forced into the zone of higher turbulence.

According to the invention the asymmetrical shape of the individual partial chambers is obtained, for instance, by providing each of the individual partial chambers with a rotationally symmetrical recess relative to the axis of the combustion chamber. The recesses are produced by curving the walls of the individual partial chambers so as to divert the inlet swirl from the wall of the cylinder towards the center of the combustion chamber, dividing it into partial flows directed towards compression swirls from the restricted areas.

The invention may also be applied to combustion chambers consisting of three partial chambers and having a three-fold symmetry if seen from above.

BRIEF DESCRIPTION OF THE DRAWINGS

The invention will now be further described by way of example, with reference to the accompanying drawings, in which.

DETAILED DESCRIPTION OF PREFERRED EMBODIMENTS

Figure 1:
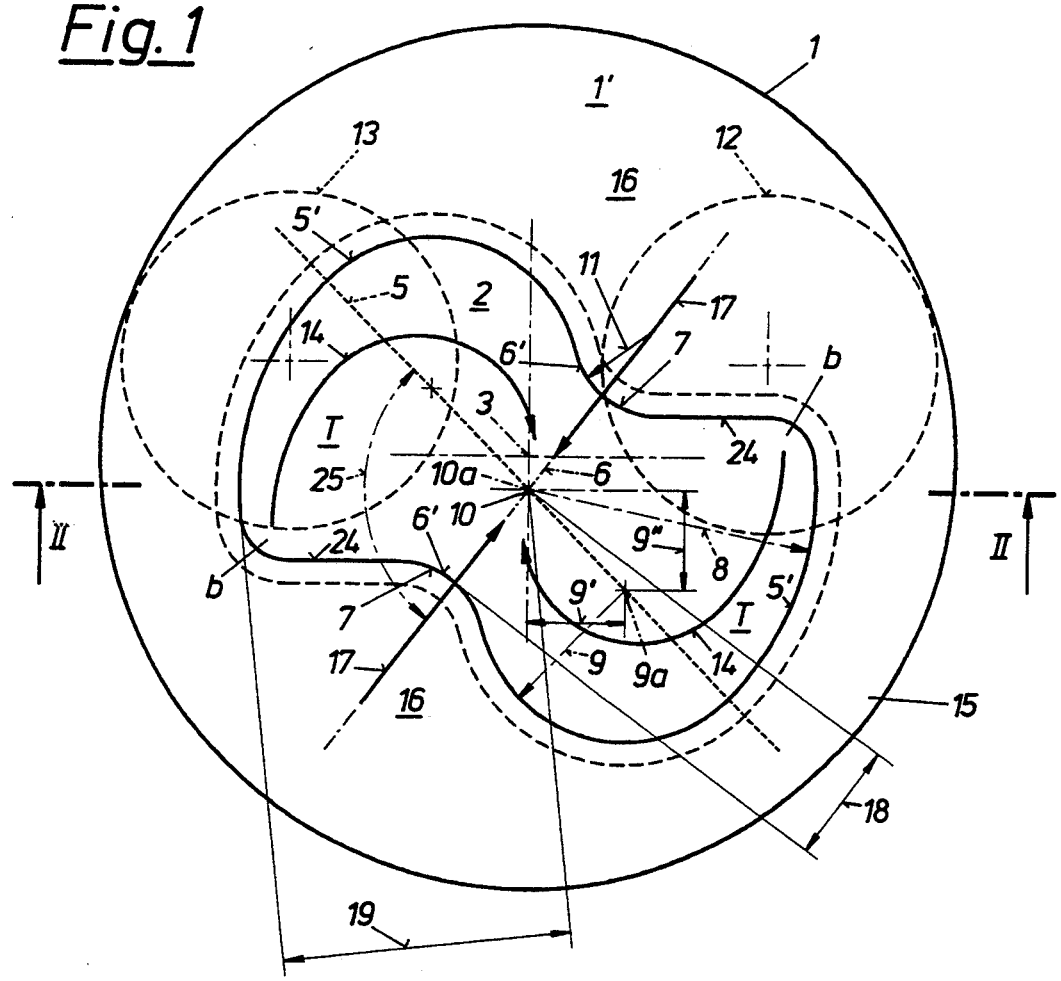
FIG. 1 is a view from above of the piston 1 in the direction I of FIG. 2.

According to FIGS. 1 and 2, a combustion chamber 2 is formed in the piston head 1' of the piston 1, which combustion chamber 2 is essentially defined by its longitudinal axis 5 and its transverse axis 6 in a cutting plane 4 normal to the longitudinal axis 3 of the piston, directly below the piston head 1'. In the areas 6' the combustion chamber 2 has marked restrictions 7 dividing the combustion chamber into two partial chambers T. In the area 5' of the longitudinal axis 5 of the combustion chamber, the wall 2' of the combustion chamber has a concave shape in the direction of the piston axis, and the largest radius of curvature 8 in this area. In this variant the walls 2' of the combustion chamber are configured centrically symmetric with regard to the center 10 of the combustion chamber. The restrictions 7 in the areas 6' are shaped so as to be convex towards the center 10 of the combustion chamber, and are characterized by a radius of curvature 11. Two opposing transition areas 24, which are point-symmetrical relative to the center 10 of the combustion chamber and lead from the concave area 5' to the convex area 640, are essentially configured plane. The longitudinal axis 5 and the transverse axis 6 of the combustion chamber are inclined towards each other at an angle 25, i.e., between 35° and 145°. 9' and 9" give the position of the center of curvature 9a relative to the center 10 of the combustion chamber. The contour of the combustion chamber may be composed of one or several circular arcs or more general curves. In the variant of FIG. 1 the center 10 of the combustion chamber is at a distance 10' from the longitudinal axis 3 of the piston. The intake valve 12 and the exhaust valve 13 are indicated by broken lines.

The individual partial chambers T each have a recess b, which is arranged rotation-symmetrically relative to the axis 10a of the combustion chamber. Due to the special shape of the combustion chamber the charge flows 14 from the compression areas 16 are augmented by further charge flows (arrows 17) assuming the character of compression swirls.

A satisfactory turbulence is dependent on the ratio of the minimum distance 18 of the wall 2" of the combustion chamber in the area of the restrictions 7, and of the maximum distance 19 of the wall 2' of the combustion chamber, each measured from the axis 10a of the combustion chamber, to the piston radius 22. The ratio between minimum distance 18 and piston radius 22 should be smaller or equal 0.5, that between maximum distance 19 and piston radius 22 greater 0.7. In the variant of FIGS. 1 and 2, where the bottom 2' of the combustion chamber is convex, the ratio between minimum depth 21 and maximum depth 20 of the combustion chamber should at least be 0.3. As a consequence, the compression areas 16 thus formed, which are large relative to the piston cross-section 15, give rise to the additional compression swirls 17. In this instance the convex bottom 2" of the combustion chamber will force the cylinder charge into zones of higher turbulence.

The charge flows 14 and 17 may be increased by giving the wall 2' of the combustion chamber an inclination relative to the longitudinal axis 3 of the piston, i.e., of an angle 23 of 10° approximately.

Figure 2:
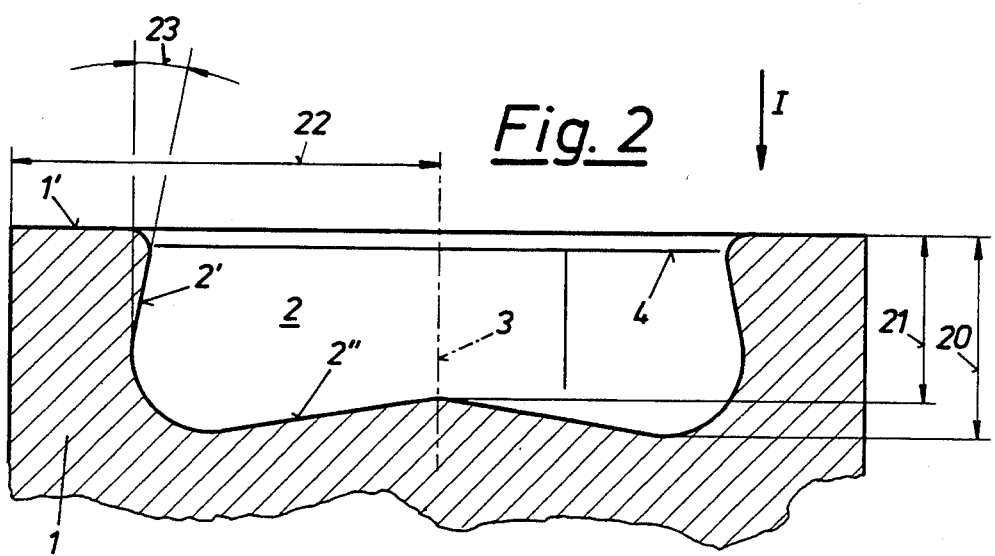
FIG. 2 Shows a section through the piston head according to line II—II in FIG. 1.
Figure 3:
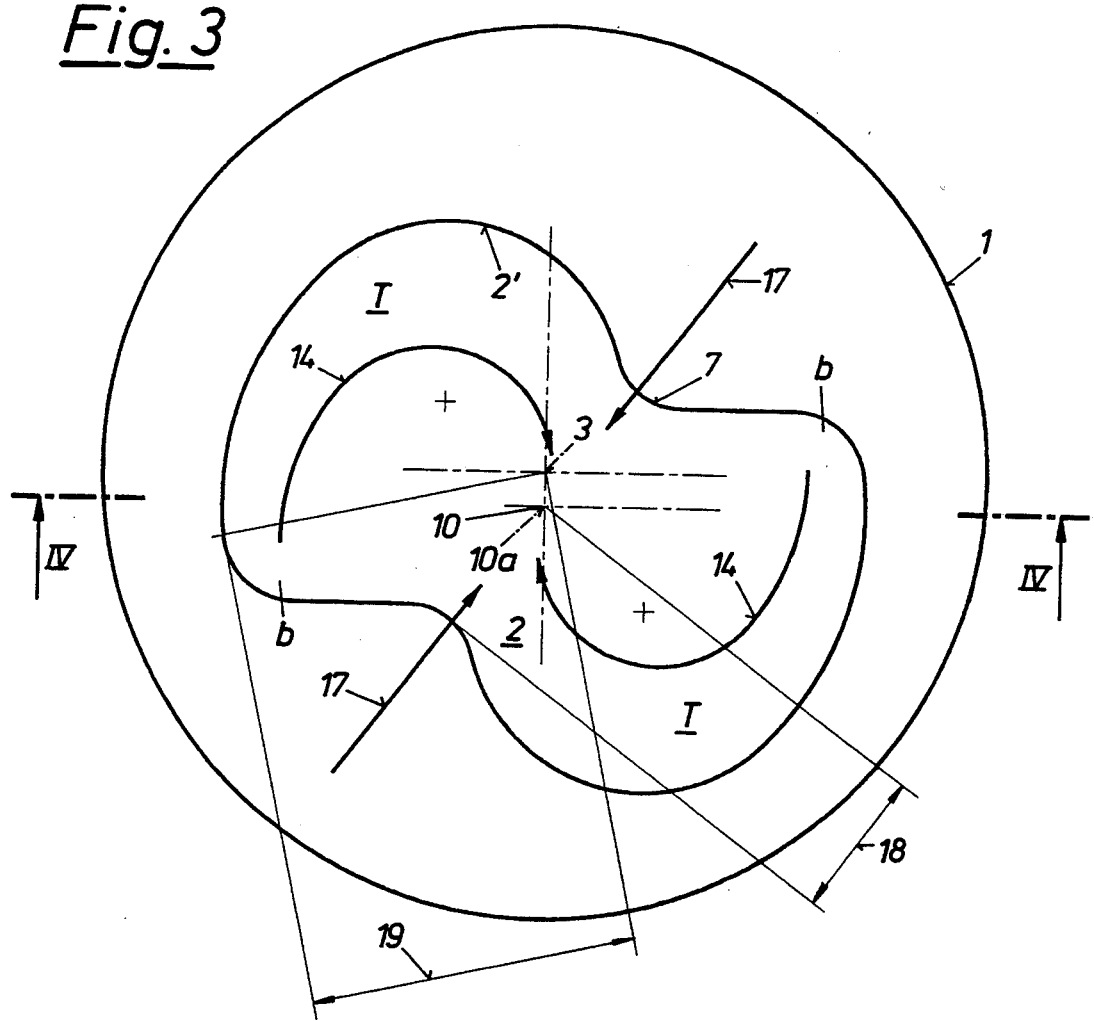
FIGS. 3, 4, and 5, 6, respectively, show variants of the invention, the view corresponding with that of FIGS. 1 and 2.
Figure 4:
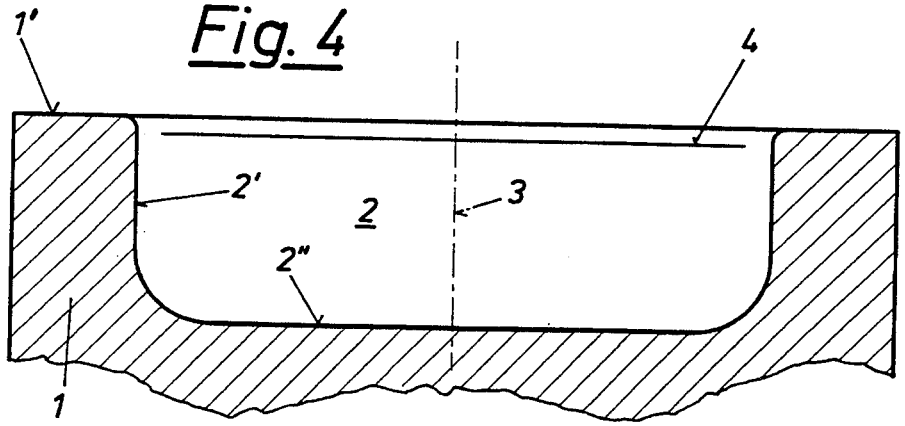
Figure 5:
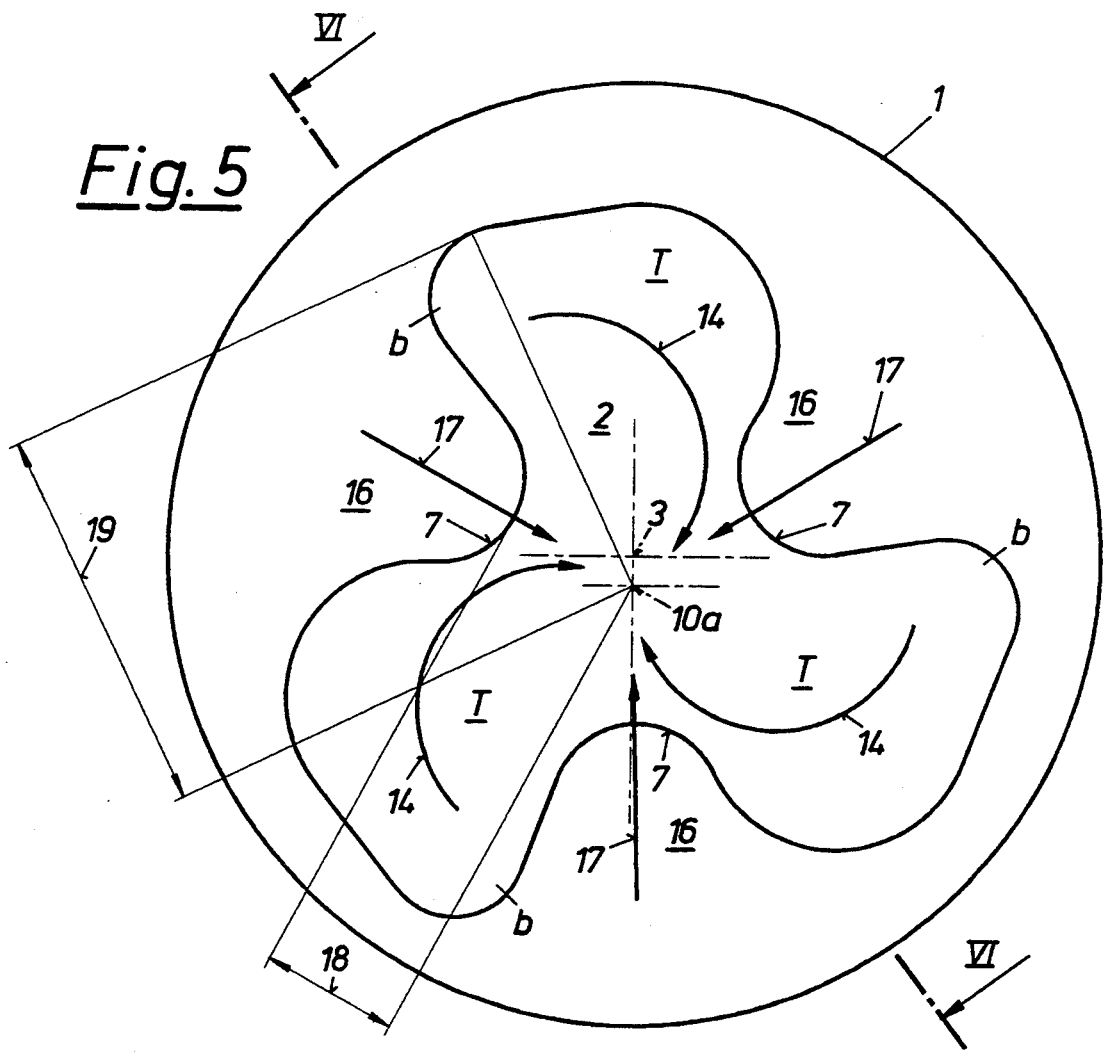
Figure 6:
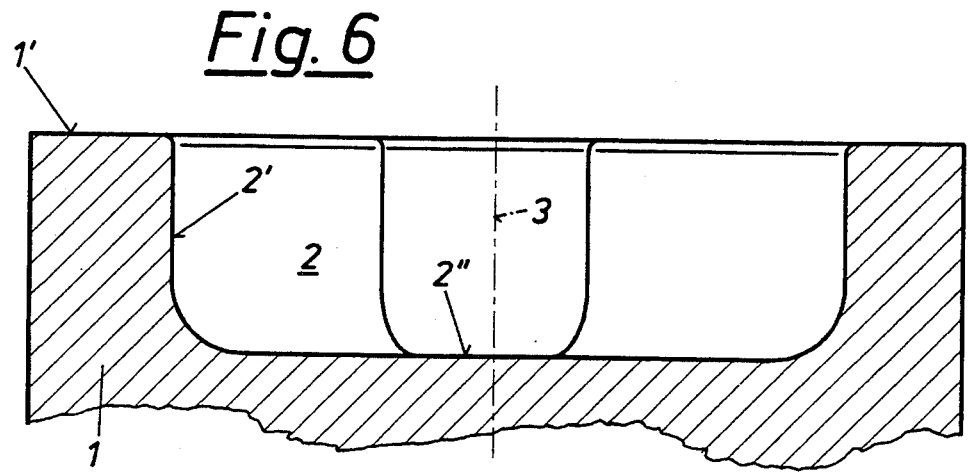

The variant of FIGS. 3 and 4 shows a simplified configuration of a combustion chamber similar to that of FIGS. 1 and 2. In this variant the bottom 2" of the combustion chamber is plane, and the wall 2' is not slanted. In the variant of FIGS. 5 and 6 the combustion chamber is made up of a total of three partial chambers T, which are arranged in three-fold symmetry. Again, rotationally-symmetric recesses b are formed, which together with the restrictions 7 will give rise to charge flows 14 and compression swirls 17 meeting in the center 10 of the combustion chamber. As regards the ratios between minimum distance 18, or maximum distance 19, and the piston radius 22 the same conditions apply as discussed above.

We claim:

1. An internal combustion engine comprising at least one reciprocating piston having a piston head and a longitudinal axis and a combustion chamber being located in said piston, said combustion chamber having a bottom, a wall and a central axis being parallel to said longitudinal axis of said piston, said combustion chamber is divided into at least two partial chambers by restrictions extending to said bottom of said combustion chamber, said partial chambers being shaped asymmetrically as seen from above and being arranged rotation-symmetrically relative to said central axis of said combustion chamber, with a minimum distance at said restrictions of said wall of said combustion chamber and a maximum distance in concave-shaped areas of said wall of said combustion chamber, measured in a cutting plane directly below said piston head, departing from said central axis of said combustion chamber, wherein the ratio between said minimum distance and said maximum distance being greater than or equal to 0.2, and the ratio between said minimum distance at said restrictions and the piston radius is smaller than or equal to 0.5, wherein said wall of said combustion chamber having a convex shape in an area of said restrictions, and wherein the ratio between said maximum distance and the piston radius is greater than or equal to 0.7.

2. An internal combustion engine according to claim 1, wherein said wall of said combustion chamber is inclined, at least in the area of said restrictions.

3. An internal combustion engine according to claim 1, wherein said bottom of said combustion chamber has a convex shape, the ratio between minimum depth at the center of said combustion chamber and maximum depth being at least 0.3.

4. An internal combustion engine according to claim 2, wherein said bottom of said combustion chamber has a convex shape, the ratio between minimum depth at the center of said combustion chamber and maximum depth being at least 0.3.

5. An internal combustion engine according to claim 1, wherein each of said partial chambers is provided with a rotationally symmetrical recess relative to said central axis of said combustion chamber.

6. An internal combustion engine according to claim 4, wherein each of said partial chambers is provided with a rotationally symmetrical recess relative to said central axis of said combustion chamber.

7. An internal combustion engine according to claim 1, wherein three of said partial chambers are provided, having a three-fold symmetry as seen from above.

8. An internal combustion engine according to claim 6, wherein three of said partial chambers are provided, having a three-fold symmetry as seen from above.

* * * * *